United States Patent
Hirata et al.

(10) Patent No.: US 9,581,743 B2
(45) Date of Patent: *Feb. 28, 2017

(54) OPTICAL FILM ROLL

(71) Applicant: NITTO DENKO CORPORATION, Ibaraki-shi, Osaka (JP)

(72) Inventors: Satoshi Hirata, Ibaraki (JP); Tatsuya Araki, Ibaraki (JP); Seiji Kondo, Ibaraki (JP); Kazuya Hada, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 332 days.

This patent is subject to a terminal disclaimer.

(21) Appl. No.: 14/373,765

(22) PCT Filed: Mar. 14, 2013

(86) PCT No.: PCT/JP2013/057189
§ 371 (c)(1),
(2) Date: Jul. 22, 2014

(87) PCT Pub. No.: WO2013/137389
PCT Pub. Date: Sep. 19, 2013

(65) Prior Publication Data
US 2015/0029447 A1 Jan. 29, 2015

(30) Foreign Application Priority Data
Mar. 14, 2012 (JP) ................... 2012-057935

(51) Int. Cl.
*G02B 5/30* (2006.01)
*B29C 55/14* (2006.01)
(Continued)

(52) U.S. Cl.
CPC .............. *G02B 5/305* (2013.01); *B29C 55/14* (2013.01); *B29C 55/16* (2013.01); *G02B 5/3033* (2013.01);
(Continued)

(58) Field of Classification Search
CPC .......... B29K 2029/04; B29K 2995/003; G02B 5/3033; G02B 5/305; G02F 1/133533;
(Continued)

(56) References Cited

U.S. PATENT DOCUMENTS 7,980,285 B2 7/2011 Kitada et al.
8,083,885 B2 12/2011 Kitada et al.
(Continued)

FOREIGN PATENT DOCUMENTS

CN 101604045 A 12/2009
CN 101889222 A * 11/2010 ............. G02B 1/105
(Continued)

OTHER PUBLICATIONS

Taiwanese Office Action dated Nov. 24, 2014, issued in Taiwanese Application No. 102109094; w/English translation. (12 pages).
(Continued)

*Primary Examiner* — Sophie Hon
(74) *Attorney, Agent, or Firm* — Westerman, Hattori, Daniels & Adrian, LLP

(57) ABSTRACT

An optical film roll is disclosed capable of realizing excellent display characteristics while maintaining manufacturing efficiency. The optical film roll has a width corresponding to a pair of opposite sides of a liquid crystal cell and is used by being cut to a length corresponding to another pair of opposite sides of the liquid crystal cell to be continuously attached to a surface of the liquid crystal cell. The optical film roll includes a long optical film wound into a roll shape, the long optical film being obtained by subjecting a long
(Continued)

optical raw film, which includes a polarizing film having an absorption axis in its width direction, to a slitting process in a machine direction while conveying the long optical raw film in its lengthwise direction. The polarizing film includes a polyvinyl alcohol-based resin film that contains a dichromatic substance and has an Nz coefficient of 1.10 or more.

11 Claims, 6 Drawing Sheets

(51) Int. Cl.
B29C 55/16 (2006.01)
G02F 1/1335 (2006.01)
B29K 29/00 (2006.01)

(52) U.S. Cl.
CPC .... *G02F 1/133533* (2013.01); *B29K 2029/04* (2013.01); *B29K 2995/0034* (2013.01); *G02F 2001/133531* (2013.01); *Y10T 83/0448* (2015.04); *Y10T 428/1041* (2015.01)

(58) Field of Classification Search
CPC ... G02F 2001/133531; Y10T 428/1041; Y10T 83/0448; B29C 55/14; B29C 55/16
See application file for complete search history.

(56) References Cited

U.S. PATENT DOCUMENTS

| 8,088,463 | B2 | 1/2012 | Kitada et al. |
| 8,114,237 | B2 | 2/2012 | Kitada et al. |
| 8,269,928 | B2 | 9/2012 | Higashi et al. |
| 8,427,625 | B2 | 4/2013 | Koshio et al. |
| 9,081,146 | B2 * | 7/2015 | Araki .................... B29C 39/18 |
| 2009/0176037 | A1 * | 7/2009 | Otoshi .................. B29C 55/165 428/1.1 |
| 2009/0263608 | A1 | 10/2009 | Kitada et al. |
| 2010/0206977 | A1 | 8/2010 | Kitada et al. |
| 2010/0212822 | A1 | 8/2010 | Kitada et al. |
| 2010/0253892 | A1 | 10/2010 | Higashi et al. |
| 2010/0258250 | A1 | 10/2010 | Kitada et al. |
| 2010/0277675 | A1 * | 11/2010 | Higashi ................. G02B 1/105 349/96 |
| 2010/0300606 | A1 | 12/2010 | Kitada et al. |
| 2011/0025958 | A1 | 2/2011 | Koshio et al. |
| 2011/0126988 | A1 | 6/2011 | Kitada et al. |
| 2012/0003400 | A1 * | 1/2012 | Nishimura .............. B32B 27/08 428/1.1 |
| 2012/0055608 | A1 | 3/2012 | Kitagawa et al. |

FOREIGN PATENT DOCUMENTS

| JP | 2001-305347 A | 10/2001 | |
| JP | 2009-93074 A | 4/2009 | |
| JP | 2009-113123 A | 5/2009 | |
| JP | 2009-276757 A | 11/2009 | |
| JP | 2009-282140 A | 12/2009 | |
| JP | 2009300768 A * | 12/2009 | ............. G02B 5/30 |
| JP | 4406043 B2 | 1/2010 | |
| JP | 2010-243858 A | 10/2010 | |
| TW | 200946570 A | 11/2009 | |
| TW | WO 2010092926 A1 * | 8/2010 | ............. B32B 27/08 |
| TW | 201038983 A | 11/2010 | |
| WO | 2009/128416 A1 | 10/2009 | |
| WO | 2010/092926 A1 | 8/2010 | |
| WO | 2012/176614 A1 | 12/2012 | |

OTHER PUBLICATIONS

Office Action dated Nov. 25, 2015, issued in counterpart Chinese Patent Application No. 2013800137243, with English translation. (9 pages).
International Search Report dated Jun. 18, 2013, issued in corresponding application No. PCT/JP2013/057189.
Korean Office Action dated Sep. 30, 2015, issued in Korean Patent Application No. 2014-7024962 w/english translation. (20 pages).

* cited by examiner

OPTICAL FILM ROLL

TECHNICAL FIELD

The present invention relates to an optical film roll.

BACKGROUND ART

There are many proposals concerning a method involving, in a manufacturing line for a liquid crystal display panel, cutting a roll-shaped optical film while feeding the optical film to attach the optical film to a liquid crystal cell (so-called roll-to-panel; RTP) (for example, Patent Literature 1). For example, in Patent Literature 1, there is a disclosure of a method involving: while feeding a long optical film from an optical film roll, cutting the optical film to a length corresponding to a long side of a liquid crystal cell to attach the optical film to one surface of the liquid crystal cell, the optical film roll being obtained by winding into a roll shape a long optical film that includes a polarizing film having an absorption axis in its longitudinal direction and has been subjected to a cutting process (slitting process) to a width corresponding to a short side of the liquid crystal cell; and then while feeding a roll-shaped optical film that includes a polarizing film having an absorption axis in its longitudinal direction and has been subjected to a slitting process to a width corresponding to the long side of the liquid crystal cell, cutting the optical film to a length corresponding to the short side of the liquid crystal cell to attach the optical film to the other surface of the liquid crystal cell. In such method, however, in order to dispose polarizing films on both sides of the liquid crystal cell so that their absorption axes may be perpendicular to each other, it is necessary, for example, to rotate the liquid crystal cell 90° after attaching one of the optical films, or to dispose conveyance lines for long optical films from two optical film rolls so as to be perpendicular to each other. Consequently, there arises a problem in that a manufacturing apparatus is increased in complexity, size, and cost.

For example, it has been proposed that the problem involved in the technology disclosed in Patent Literature 1 can be solved by using a polarizing film having an absorption axis in its width direction for one of the optical films (for example, Patent Literature 2). However, when the polarizing film having an absorption axis in its width direction is used, there arises a problem in that display characteristics of a liquid crystal display panel to be obtained are insufficient.

CITATION LIST

Patent Literature

[PTL 1] JP 4406043 B2
[PTL 2] JP 2009-276757 A

SUMMARY OF INVENTION

Technical Problem

The present invention has been made in order to solve the problems of the related art, and a main object of the present invention is to provide an optical film roll capable of realizing excellent display characteristics while maintaining manufacturing efficiency.

Means for Solving the Problems

According to one aspect of the present invention, an optical film roll is provided. The optical film roll has a width corresponding to a pair of opposite sides of a liquid crystal cell and is used by being cut to a length corresponding to another pair of opposite sides of the liquid crystal cell to be continuously attached to a surface of the liquid crystal cell. The optical film roll includes a long optical film wound into a roll shape, the long optical film being obtained by subjecting a long optical raw film, which includes a polarizing film having an absorption axis in its width direction, to a slitting process in a machine direction while conveying the long optical raw film in its lengthwise direction. The polarizing film includes a polyvinyl alcohol-based resin film that contains a dichromatic substance and has an Nz coefficient of 1.10 or more.

In one embodiment of the invention, the polarizing film has a thickness of less than 10 μm.

In another embodiment of the invention, the polarizing film is obtained by shrinking and stretching a polyvinyl alcohol-based resin film or a polyvinyl alcohol-based resin layer formed on a thermoplastic resin substrate in an MD and a TD, respectively.

In still another embodiment of the invention, the optical raw film includes a release film, a pressure-sensitive adhesive layer, and the polarizing film, which are laminated in the stated order.

In still another embodiment of the invention, the optical raw film includes a release film, a pressure-sensitive adhesive layer, the polarizing film, and the reflective polarizing film, which are laminated in the stated order.

According to another aspect of the invention, an optical film roll set is provided. The optical film roll set includes a first optical film roll including the optical film roll and a second optical film roll that has a width corresponding to the pair of opposite sides of the liquid crystal cell, is used by being cut to a length corresponding to the another pair of opposite sides of the liquid crystal cell to be continuously attached to a surface of the liquid crystal cell, and includes a long optical film wound into a roll shape, the long optical film including a polarizing film having an absorption axis in its lengthwise direction.

In one embodiment of the invention, a driving mode of the liquid crystal cell is a VA mode or an IPS mode.

According to still another aspect of the invention, a manufacturing method for an optical film roll is provided. The manufacturing method for an optical film roll having a width corresponding to a pair of opposite sides of a liquid crystal cell, and used by being cut to a length corresponding to another pair of opposite sides of the liquid crystal cell to be continuously attached to a surface of the liquid crystal cell includes the steps of:

subjecting a long optical raw film, which includes a polarizing film having an absorption axis in its width direction, to a slitting process in a direction parallel to a lengthwise direction of the long optical raw film to a width corresponding to the pair of opposite sides of the liquid crystal cell, the polarizing film including a polyvinyl alcohol-based resin film that contains a dichromatic substance and has an Nz coefficient of 1.10 or more; and winding a long optical film obtained in the slitting step into a roll shape.

In one embodiment of the invention, the polarizing film has a thickness of less than 10 μm.

Advantageous Effects of Invention

The optical film roll according to one embodiment of the present invention can be used to provide a liquid crystal display panel having excellent display characteristics while being excellent in manufacturing efficiency.

DESCRIPTION OF EMBODIMENTS

Figure 1A:
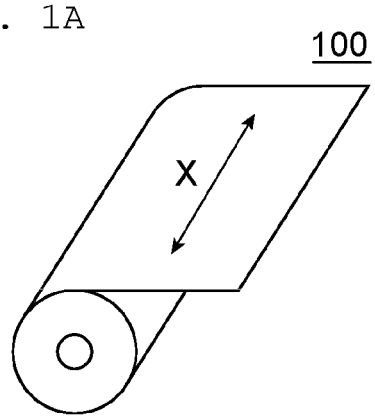
FIG. 1A is a schematic perspective view of an optical film roll according to a preferred embodiment of the present invention.
Figure 1B:
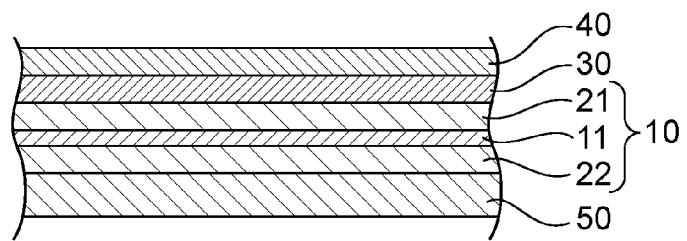
FIG. 1B is a partially enlarged cross-sectional view of the film of FIG. 1A.
Figure 1C:
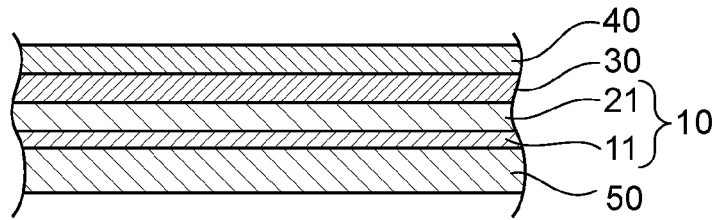
FIG. 1C is a partially enlarged cross-sectional view of an optical film according to another embodiment of the present invention.
Figure 1D:
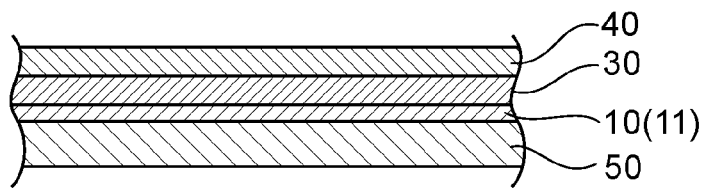
FIG. 1D is a partially enlarged cross-sectional view of an optical film according to still another embodiment of the present invention.

Hereinafter, preferred embodiments of the present invention are described. However, the present invention is not limited to these embodiments.
(Definitions of Terms and Symbols)
The definitions of terms and symbols used herein are as described below.
(1) Refractive Index (nx, ny, nz)
"nx" represents a refractive index in a direction in which an in-plane refractive index is maximum (i.e., a slow axis direction), "ny" represents a refractive index in a direction perpendicular to the slow axis in a plane, and "nz" represents a refractive index in a thickness direction.
(2) Front Retardation (Re)
A front retardation (Re) is determined by Re=(nx−ny)×d, where d (nm) represents the thickness of a film (layer).
(3) Thickness Direction Retardation (Rth)
A thickness direction retardation (Rth) is determined by Rth={(nx+ny)/2−nz}×d, where d (nm) represents the thickness of the film (layer).
(4) Nz Coefficient
An Nz coefficient is determined by Nz=(nx−nz)/(nx−ny).
FIG. 1A is a schematic perspective view of an optical film roll according to a preferred embodiment of the present invention, FIG. 1B is a partially enlarged cross-sectional view of the film of FIG. 1A, FIG. 1C is a partially enlarged cross-sectional view of a film according to another embodiment, and FIG. 1D is a partially enlarged cross-sectional view of a film according to still another embodiment.

An optical film roll 100 is formed of a long optical film wound into a roll shape. The optical film 100 has a width corresponding to a pair of opposite sides of a liquid crystal cell to which the optical film 100 is to be attached. More specifically, the optical film 100 has a width corresponding to the sides of the liquid crystal cell in a direction (width direction) perpendicular to a direction (attaching direction) in which the optical film 100 is continuously attached to a surface of the liquid crystal cell in RTP. The optical film 100 includes a polarizing plate 10. In one embodiment, as illustrated in FIG. 1B, the polarizing plate 10 includes a polarizing film 11, a first protective film 21 disposed on one side of the polarizing film 11, and a second protective film 22 disposed on the other side of the polarizing film 11. According to this embodiment, there is an advantage in that both surfaces of the polarizing film, which are liable to undergo changes in characteristics, are protected, and thus there is obtained a polarizing plate that undergoes little changes in characteristics with respect to an environmental change. In another embodiment, as illustrated in FIG. 1C, the polarizing plate 10 includes the polarizing film 11 and the first protective film 21 disposed on one side of the polarizing film 11. That is, the second protective film 22 may be omitted. According to this embodiment, there is an advantage in that a reduction in thickness can be achieved while moderate resistance to an environmental change is imparted. Instill another embodiment, as illustrated in FIG. 1D, the polarizing plate 10 may consist of the polarizing film 11. That is, the first protective film 21 and the second protective film 22 may both be omitted. According to this embodiment, there is an advantage in that a great reduction in thickness can be achieved. The optical film 100 includes a pressure-sensitive adhesive layer 30 disposed on one side of the polarizing plate 10 (on the first protective film 21 side). As illustrated in the figures, in a practical case, a release film 40 is attached to the surface of the pressure-sensitive adhesive layer 30, and a surface protective film 50 is disposed as an outermost layer on the opposite side (on the surface of the second protective film 22 in the illustrated examples). The optical film 100 may include any other film (layer) (not shown).

In the long optical film 100, the polarizing film 11 has an absorption axis in its width direction X. In this context, the direction of the absorption axis of the polarizing film 11 may encompass directions at from −5° to +5° counterclockwise with respect to the width direction X of the optical film. Each member is described below.

A. Polarizing Plate

The polarizing plate includes at least the polarizing film. The polarizing plate preferably has a construction in which a protective film is disposed on at least one side of the polarizing film.

A-1. Polarizing Film

The polarizing film is typically formed of a polyvinyl alcohol-based resin (hereinafter referred to as "PVA-based resin") film containing a dichromatic substance.

Examples of the dichromatic substance include iodine and an organic dye. They may be used alone or in combination. Of those, iodine is preferably used.

Any appropriate resin may be used as the PVA-based resin for forming the PVA-based resin film. Examples of the resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically from 85 mol % to 100 mol %, preferably from 95.0 mol % to 99.95 mol %, more preferably from 99.0 mol % to 99.93 mol %. The saponification degree may be determined in conformity with JIS K 6726-1994. The use of the PVA-based resin having such saponification degree can provide a polarizing film excellent in durability. When the saponification degree is excessively high, the resin may gel.

The average polymerization degree of the PVA-based resin may be appropriately selected depending on purposes. The average polymerization degree is typically from 1,000 to 10,000, preferably from 1,200 to 4,500, more preferably from 1,500 to 4,300. It should be noted that the average polymerization degree may be determined in conformity with JIS K 6726-1994.

The Nz coefficient of the PVA-based resin film is 1.10 or more, preferably 1.20 or more. When the alignment property of the PVA-based resin film (alignment state of polyvinyl alcohol-based resin molecules) is thus controlled, for example, a problem such as the generation of a crack (small chip or burr) in the edge side (slit surface) of the polarizing film in the case where a slitting process is continuously performed at a high speed to the width of a liquid crystal cell is suppressed, and thus accuracy (dimensional accuracy of the film) in cutting (including half-cutting) in the width direction of the optical film to be performed with reference to the edge side (slit surface) and attaching accuracy can be more easily obtained in RTP. On the other hand, the Nz coefficient of the PVA-based resin film is preferably 1.50 or less, more preferably 1.40 or less. When the Nz coefficient is more than 1.50, the alignment property (uniaxiality) of the PVA-based resin film is low, and hence for example, display quality demanded of a liquid crystal television may not be obtained.

Figure 2:
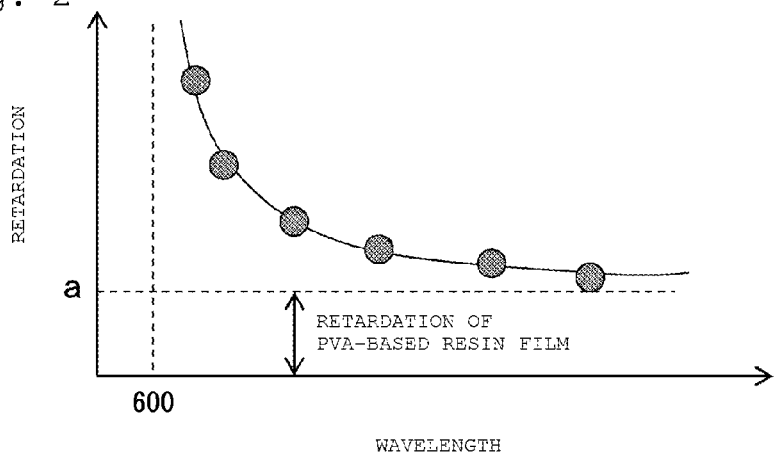
FIG. 2 is a graph illustrating a calculation method for the Nz coefficient of a polyvinyl alcohol-based resin film.

The Nz coefficient of the PVA-based resin film is an indicator for the alignment property of the molecular chains of the PVA-based resin film, and is calculated from the retardation of the PVA-based resin film. The retardation (a-value) of the PVA-based resin film is determined by: measuring the retardation of the polarizing film at various measurement wavelengths ($\lambda$); plotting the retardation of the polarizing film against the measurement wavelength on the horizontal axis as illustrated in FIG. 2; creating an approximate curve on the basis of the following equation; and calculating an asymptote (a-value) from the approximate curve. In this case, the retardation of the polarizing film is measured from its front and oblique directions.

$$R=a+b/(\lambda^2-600^2)$$

In the equation, R represents the retardation of the polarizing film, a represents the retardation of the PVA-based resin film, and b represents a constant.

The polarizing film preferably shows absorption dichroism at any wavelength in the wavelength range of from 380 nm to 780 nm. The polarization degree of the polarizing film at a single axis transmittance of 40% or 41% is preferably 99.9% or more, more preferably 99.93% or more, still more preferably 99.95% or more.

The thickness of the polarizing film may be set to any appropriate value. The thickness is preferably 30 µm or less, more preferably 25 µm or less, still more preferably 20 µm or less, particularly preferably less than 10 µm. In general, a polarizing film has a larger shrinkage force than a protective film, and hence a stress is generated at an interface between the polarizing film and the protective film, which may cause a crack. The shrinkage force of the polarizing film depends on its thickness. As the thickness becomes thinner, the shrinkage force reduces and a polarizing plate excellent in durability can be obtained. On the other hand, the thickness is preferably 0.5 µm or more, more preferably 1 µm or more. When the thickness is less than 0.5 µm, sufficient optical characteristics may not be obtained.

A-2. Manufacturing Method for Polarizing Film

The polarizing film is manufactured by any appropriate method as long as the film has an absorption axis in its width direction. The polarizing film is typically manufactured by appropriately subjecting a PVA-based resin film to treatment such as stretching or dyeing.

A-2-1. PVA-Based Resin Film

The PVA-based resin film is typically formed in a long shape. The thickness of the PVA-based resin film is preferably less than 100 µm. For example, the PVA-based resin film may be a PVA-based resin film, or may be a PVA-based resin layer formed on a thermoplastic resin substrate. The PVA-based resin film is preferably used in the case of manufacturing a polarizing film having a thickness of 10 µm or more. The thickness of the PVA-based resin film is preferably from 30 µm to 80 µm. A laminate of the thermoplastic resin substrate and the PVA-based resin layer is preferably used in the case of manufacturing a polarizing film having a thickness of less than 10 µm. The thickness of the PVA-based resin layer is preferably from 3 µm to 20 µm. Even with such thin thickness, the use of the thermoplastic resin substrate enables satisfactory stretching.

The thickness (before stretching) of the thermoplastic resin substrate for forming the laminate is preferably from 50 µm to 250 µm. When the thickness is less than 50 µm, the substrate may rupture at the time of its stretching. In addition, the substrate becomes so thin after the stretching that it may become difficult to convey the substrate. When the thickness exceeds 250 µm, an excessive load may be applied to a stretching machine. In addition, the conveyance may become difficult.

As a formation material for the thermoplastic resin substrate, there are given, for example: ester-based resins such as a polyethylene terephthalate-based resin; cycloolefin-based resins; olefin-based resins such as polypropylene; polyamide-based resins; polycarbonate-based resins; and copolymer resins thereof. Of those, a cycloolefin-based resin (such as a norbornene-based resin) and an amorphous polyethylene terephthalate-based resin are preferred. Specific examples of the amorphous polyethylene terephthalate-based resin include a copolymer further containing isophthalic acid as a dicarboxylic acid and a copolymer further containing cyclohexanedimethanol as a glycol.

The glass transition temperature (Tg) of the thermoplastic resin substrate is preferably 170° C. or less. The use of such thermoplastic resin substrate enables the stretching of the laminate at such a temperature that the crystallization of a PVA-based resin does not rapidly progress, and can suppress an inconvenience due to the crystallization (e.g., the inhibition of the alignment of the PVA-based resin layer by the stretching). It should be noted that the glass transition temperature (Tg) is a value determined in conformity with JIS K 7121.

The thermoplastic resin substrate is preferably stretched before the formation of the PVA-based resin layer. A stretching direction may be set to any appropriate direction. In one embodiment, the stretching direction is the machine direction (MD) of the thermoplastic resin substrate. The machine direction is preferably the lengthwise direction of the long thermoplastic resin substrate, which may encompass directions at from −5° to +5° counterclockwise with respect to the lengthwise direction of the thermoplastic resin substrate. In another embodiment, the stretching direction is a direction (TD) perpendicular to the machine direction. The direction perpendicular to the machine direction is preferably the width direction of the long thermoplastic resin substrate, which may encompass directions at from 85° to 95° counterclockwise with respect to the lengthwise direction of the thermoplastic resin substrate. It should be noted that the term "perpendicular" as used herein also includes "substantially perpendicular". Herein, the term "substantially perpendicular" includes a case at 90°±5.0°, preferably 90°±3.0°, more preferably 90°±1.0 °.

Any appropriate method may be adopted as a method of stretching the thermoplastic resin substrate. Specifically, fixed-end stretching may be adopted, or free-end stretching (such as a method involving passing the thermoplastic resin substrate between rolls having different peripheral speeds to uniaxially stretch the thermoplastic resin substrate) may be adopted. The stretching of the thermoplastic resin substrate may be performed in one stage, or may be performed in a plurality of stages. When the stretching is performed in a plurality of stages, the stretching ratio of the thermoplastic resin substrate to be described later is the product of stretching ratios in the respective stages. In addition, a stretching mode in this step is not particularly limited, and may be an in-air stretching mode, or may be an underwater stretching mode.

The stretching temperature of the thermoplastic resin substrate may be set to any appropriate value depending on, for example, a formation material for the thermoplastic resin substrate and the stretching mode. The stretching temperature is typically equal to or higher than the glass transition temperature (Tg) of the thermoplastic resin substrate, preferably Tg+10° C. or more, still more preferably from Tg+15° C. to Tg+30° C. When the underwater stretching mode is adopted as the stretching mode and an amorphous polyethylene terephthalate-based resin is used as the formation material for the thermoplastic resin substrate, the stretching temperature may be set lower than the glass transition temperature (for example, from 60° C. to 100° C.) of the thermoplastic resin substrate.

The stretching ratio of the thermoplastic resin substrate is preferably 1.5 times or more, more preferably 1.75 times or more with respect to the original length of the thermoplastic resin substrate. When the stretching ratio is set to 1.5 times or more, the laminate to be described later can be shrunk more uniformly. On the other hand, the stretching ratio is preferably 2.5 times or less.

The thermoplastic resin substrate may be subjected to surface modification treatment (such as corona treatment) in advance, or an easy-adhesion layer may be formed on the thermoplastic resin substrate. The performance of such treatment can improve adhesiveness between the thermoplastic resin substrate and the PVA-based resin layer. It should be noted that the surface modification treatment and/or the formation of the easy-adhesion layer may be performed before the stretching or may be performed after the stretching.

Any appropriate method may be adopted as a method of forming the PVA-based resin layer. The PVA-based resin layer is preferably formed by applying an application liquid containing the PVA-based resin onto the thermoplastic resin substrate and drying the liquid. It should be noted that the thus obtained PVA-based resin layer may be used not only as the laminate (as formed on the thermoplastic resin substrate), but also as a PVA-based resin film after being peeled from the thermoplastic resin substrate.

The application liquid is typically a solution prepared by dissolving the PVA-based resin in a solvent. Examples of the solvent include water, dimethyl sulfoxide, dimethylformamide, dimethylacetamide, N-methylpyrrolidone, various glycols, polyhydric alcohols such as trimethylolpropane, and amines such as ethylenediamine and diethylenetriamine. They may be used alone or in combination. Of those, water is preferred. The concentration of the PVA-based resin in the solution is preferably from 3 parts by weight to 20 parts by weight with respect to 100 parts by weight of the solvent. At such resin concentration, a uniform coating film in close contact with the thermoplastic resin substrate can be formed.

The application liquid may be compounded with an additive. Examples of the additive include a plasticizer and a surfactant. Examples of the plasticizer include polyhydric alcohols such as ethylene glycol and glycerin. Examples of the surfactant include nonionic surfactants. Such additive may be used for the purpose of additionally improving the uniformity, dyeing property, or stretchability of the PVA-based resin layer to be obtained.

Any appropriate method may be adopted as an application method for the application liquid. Examples thereof include a roll coating method, a spin coating method, a wire bar coating method, a dip coating method, a die coating method, a curtain coating method, a spray coating method, and a knife coating method (such as a comma coating method).

The drying temperature is preferably equal to or less than the glass transition temperature (Tg) of the thermoplastic resin substrate, more preferably equal to or less than Tg-20° C. Drying the liquid at such temperature prevents the thermoplastic resin substrate from deforming before the formation of the PVA-based resin layer, and hence can prevent the deterioration of the alignment property of the PVA-based resin layer to be obtained. Thus, the thermoplastic resin substrate can satisfactorily deform together with the PVA-based resin layer, and hence the shrinkage and stretching of the laminate to be described later can be satisfactorily performed. As a result, good alignment property can be imparted to the PVA-based resin layer, and hence a polarizing film having excellent optical characteristics can be obtained. The term "alignment property" as used herein refers to the alignment of molecular chains in the PVA-based resin layer.

The water content of the PVA-based resin layer is preferably 20% or less, more preferably 15% or less.

A-2-2. Stretching

Figure 4:
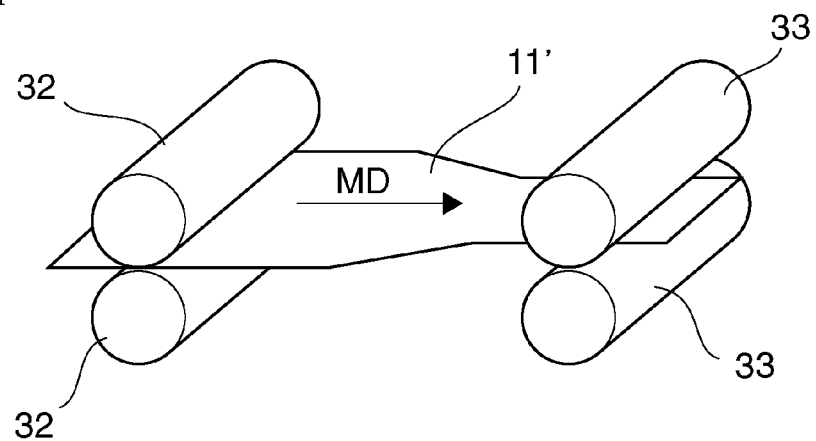
FIG. 4 is a schematic view illustrating a specific example of a manufacturing method for a polarizing film.

As a stretching method, for example, there are given: fixed-end stretching using a tenter stretching machine; free-end stretching using rolls having different peripheral speeds; biaxial stretching using a simultaneous biaxial stretching machine; and sequential biaxial stretching. They may be used alone or in combination. Specifically, in the case where, as illustrated in FIG. 4, a PVA-based resin film 11' is passed between rolls 32, 32, 33, 33 having different peripheral speeds to be stretched in the machine direction (MD) (free-end stretching), for example, there is given a mode in which the stretching in the machine direction is combined with stretching in the direction (TD) perpendicular to the machine direction. It should be noted that the Nz coefficient may be controlled by appropriately selecting stretching conditions such as the stretching method, the stretching ratio, and the stretching temperature. A preferred embodiment is specifically described below.

In a preferred embodiment, the polarizing film is manufactured by shrinking and stretching the PVA-based resin film in the machine direction (MD) and the direction (TD) perpendicular to the machine direction, respectively. According to such embodiment, for example, the Nz coefficient can be satisfactorily satisfied. In this case, the machine direction is preferably the lengthwise direction of the long PVA-based resin film, which may encompass directions at from −5° to +5° counterclockwise with respect to the lengthwise direction of the PVA-based resin film. The direction perpendicular to the machine direction is preferably the width direction of the long PVA-based resin film, which may encompass directions at from 85° to 95° counterclockwise with respect to the lengthwise direction of the PVA-based resin film.

When a laminate is constructed with a thermoplastic resin substrate that has been subjected to stretching treatment in the MD in advance, the thermoplastic resin substrate can be ready to return to the state before the stretching by the stretching in the TD, heat, and the like, and hence the laminate can be uniformly shrunk in the MD. Thus, even when the shrinkage ratio is high, a problem such as the occurrence of alignment unevenness or a reduction in thickness uniformity can be suppressed to provide a polarizing film having excellent in-plane uniformity. In addition, when the laminate is stretched in the TD while being shrunk, uniaxiality in the TD can be improved and excellent optical characteristics can be obtained.

When a laminate is constructed with a thermoplastic resin substrate that has been subjected to fixed-end stretching in the TD in advance, in the thermoplastic resin substrate, a shrinking force is generated in the MD as well owing to, for example, heat at the time of the stretching in the TD, and hence the deterioration of the uniformity due to necking between the clips, which emerges as a problem in the case where the laminate is subjected to fixed-end stretching in the TD (not shrunk in the MD), can be suppressed. In particular, even when a PVA-based resin film having a thin thickness is stretched at a high ratio, a problem such as alignment unevenness or a reduction in thickness uniformity can be suppressed to provide a polarizing film having excellent in-plane uniformity. In addition, when the laminate is stretched in the TD while being shrunk, uniaxiality in the TD can be improved and excellent optical characteristics can be obtained.

The shrinkage may be performed simultaneously with the stretching, or the shrinkage and the stretching may be performed at different timings. In addition, the order in which the shrinkage and the stretching are performed is not limited, and the shrinkage may be performed in one stage, or may be performed in a plurality of stages. In one embodiment, it is preferred that the PVA-based resin film be stretched in the TD while being shrunk in the MD. In another embodiment, it is preferred that the PVA-based resin film be stretched in the TD after having been shrunk in the MD. A method of shrinking the laminate separately from the stretching is preferably, for example, a method involving heating (thermally shrinking) the laminate. The heating temperature is preferably equal to or more than the glass transition temperature (Tg) of the thermoplastic resin substrate.

For example, through the adjustment of the shrinkage ratio of the PVA-based resin film, the Nz coefficient can be satisfactorily satisfied. In one embodiment, the shrinkage ratio of the PVA-based resin film in the MD is preferably 40% or less, more preferably 35% or less, particularly preferably 20% or less. Excellent durability can be achieved. It should be noted that the shrinkage in the MD may be omitted as long as the Nz coefficient can be satisfactorily satisfied. For example, the lower limit of the shrinkage ratio in the MD may be 0% in one embodiment, and may be 5% in another embodiment.

In another embodiment, the shrinkage ratio in the MD is preferably more than 25%, more preferably more than 30% and less than 50%.

The stretching of the PVA-based resin film may be performed in one stage, or may be performed in a plurality of stages. When the stretching is performed in a plurality of stages, the stretching ratio of the PVA-based resin film to be described later is the product of stretching ratios in the respective stages. In addition, a stretching mode in this step is not particularly limited, and may be an in-air stretching (dry stretching) mode, or may be an underwater stretching (wet stretching) mode.

The stretching temperature may be set to any appropriate value depending on, for example, the stretching mode and the object to be stretched. For example, the stretching temperature in the case of stretching the laminate of the thermoplastic resin substrate and the PVA-based resin layer by the in-air stretching mode may be set to any appropriate value depending on, for example, a formation material for the thermoplastic resin substrate. The stretching temperature is typically equal to or higher than the glass transition temperature (Tg) of the thermoplastic resin substrate, preferably the glass transition temperature (Tg) of the thermoplastic resin substrate+10° C. or more, still more preferably Tg+15° C. or more. On the other hand, the stretching temperature is preferably 170° C. or less. When the stretching is performed at such temperature, rapid progress of the crystallization of the PVA-based resin can be suppressed, to thereby suppress a problem due to the crystallization (for example, rupture at the time of the stretching of the PVA-based resin film).

The stretching temperature in the case of stretching the PVA-based resin film by the in-air stretching mode is typically from 70° C. to 130° C., preferably from 80° C. to 120° C.

When the underwater stretching mode is adopted, the stretching temperature is preferably 85° C. or less, more preferably from 30° C. to 65° C. When the temperature exceeds 85° C., an inconvenience such as the elution of iodine caused to adsorb to the PVA-based resin or the elution of the PVA-based resin may occur, and hence the optical characteristics of the polarizing film to be obtained may reduce. In this case, a thermoplastic resin substrate that can be stretched even at the temperature is selected. An amorphous polyethylene terephthalate-based resin, olefin-based resin (such as polymethylpentene), or the like is preferably used as a formation material therefor.

When the underwater stretching mode is adopted, the PVA-based resin film is preferably stretched in an aqueous solution of boric acid. The use of the aqueous solution of boric acid can impart, to the PVA-based resin film, rigidity enough to withstand a tension to be applied at the time of the stretching and such water resistance that the layer does not dissolve in water. Specifically, boric acid can produce a tetrahydroxyborate anion in the aqueous solution to cross-link with the PVA-based resin through a hydrogen bond, and thus the rigidity and the water resistance can be imparted thereto. As a result, for example, a higher contrast ratio of the polarizing film can be achieved. The aqueous solution of boric acid is obtained by dissolving boric acid and/or a borate in water as a solvent. The concentration of boric acid is typically from 1 part by weight to 10 parts by weight with respect to 100 parts by weight of water. The immersion time of the PVA-based resin film in the stretching bath is preferably from about 15 seconds to 5 minutes.

The TD stretching ratio is preferably 4.0 times or more with respect to the original length of the PVA-based resin film. The shrinking in the MD enables the stretching at such high ratio, and thus a polarizing film having excellent optical characteristics can be obtained. On the other hand, the stretching ratio in the TD is preferably 6.0 times or less, more preferably 5.5 times or less.

Figure 3:
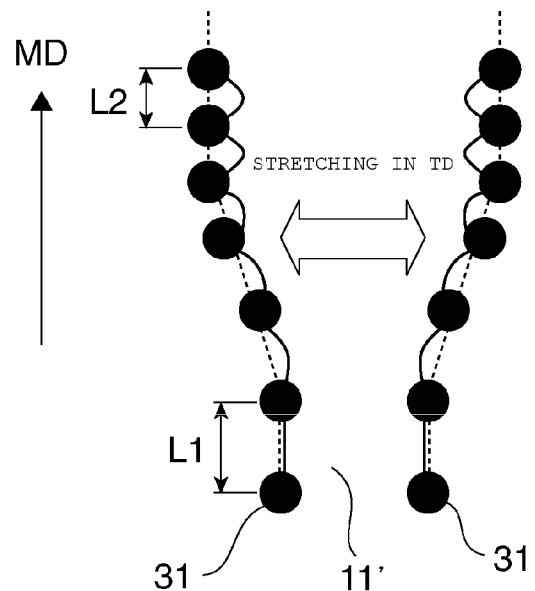
FIG. 3 is a schematic view illustrating a specific example of a manufacturing method for a polarizing film.

FIG. 3 illustrates a specific example of a shrinking and stretching step. In the illustrated example, while the PVA-based resin film 11' is conveyed in its lengthwise direction, the PVA-based resin film 11' is shrunk in the machine direction (MD) and stretched in the direction (TD) perpendicular to the machine direction using a simultaneous biaxial stretching machine. Specifically, the PVA-based resin film 11' held with left and right clips 31, 31 at a tenter inlet is stretched in the TD while being conveyed at a predetermined speed. In the illustrated example, the shrinkage of the PVA-based resin film is controlled by, for example, gradually reducing the moving speed of each clip in the machine direction to shorten a distance between the clips. The shrinkage ratio may be controlled by adjusting a distance L1 between the clips in the machine direction at the tenter inlet and a distance L2 between the clips in the machine direction at a tenter outlet (moving speed of each clip in the machine direction). Specifically, a desired shrinkage ratio can be achieved by setting the speed of each clip at the tenter outlet to "speed at tenter inlet×(1−shrinkage ratio)." It should be noted that a broken line in FIG. 3 represents a rail for the clip 31.

In the case where, as illustrated in FIG. 3, the PVA-based resin film is shrunk and stretched using the simultaneous biaxial stretching machine, the PVA-based resin film is preferably shrunk before being stretched. Specifically, the distance between the clips in the machine direction is shortened before the PVA-based resin film is stretched in the TD. According to such embodiment, a force is more uniformly applied to the PVA-based resin film during the stretching, and hence a portion held with each clip can be prevented from being selectively stretched. Specifically, a portion not held with any clip can be prevented from curving inward at an edge side of the PVA-based resin film. As a result, uniformity can be improved.

A-2-3. Other Treatments

Treatment for manufacturing the polarizing film except the stretching treatment is, for example, dyeing treatment, insolubilizing treatment, cross-linking treatment, washing treatment, or drying treatment. Those treatments may each be performed at any appropriate timing.

The dyeing treatment is typically treatment involving dyeing the PVA-based resin film with the dichromatic substance. The treatment is preferably performed by causing the dichromatic substance to adsorb to the PVA-based resin film. A method for the adsorption is, for example, a method involving immersing the PVA-based resin film in a dyeing liquid containing the dichromatic substance, a method involving applying the dyeing liquid to the PVA-based resin film, or a method involving spraying the PVA-based resin film with the dyeing liquid. Of those, a method involving immersing the PVA-based resin film in a dyeing liquid containing the dichromatic substance is preferred. This is because the dichromatic substance can satisfactorily adsorb to the film.

When iodine is used as the dichromatic substance, the dyeing liquid is preferably an aqueous solution of iodine. The compounding amount of iodine is preferably from 0.04 part by weight to 5.0 parts by weight with respect to 100 parts by weight of water. The aqueous solution of iodine is preferably compounded with an iodide salt in order that the solubility of iodine in water may be improved. Examples of the iodide salt include potassium iodide, lithium iodide, sodium iodide, zinc iodide, aluminum iodide, lead iodide, copper iodide, barium iodide, calcium iodide, tin iodide, and titanium iodide. Of those, potassium iodide and sodium iodide are preferred. The compounding amount of the iodide salt is preferably from 0.3 part by weight to 15 parts by weight with respect to 100 parts by weight of water.

The liquid temperature of the dyeing liquid at the time of the dyeing is preferably from 20° C. to 40° C. When the PVA-based resin film is immersed in the dyeing liquid, an immersion time is preferably from 5 seconds to 300 seconds. Under such conditions, the dichromatic substance can be sufficiently caused to adsorb to the PVA-based resin film.

The insolubilizing treatment and cross-linking treatment are typically performed by immersing the PVA-based resin film in an aqueous solution of boric acid. The washing treatment is typically performed by immersing the PVA-based resin film in an aqueous solution of potassium iodide. A drying temperature in the drying treatment is preferably from 30° C. to 100° C.

A-3. Protective Film

As a formation material for the protective film, there are given, for example: (meth)acrylic resins; cellulose-based resins such as diacetyl cellulose and triacetyl cellulose; cycloolefin-based resins; olefin-based resins such as polypropylene; ester-based resins such as a polyethylene terephthalate-based resin; polyamide-based resins; polycarbonate-based resins; and copolymer resins thereof. It should be noted that the thermoplastic resin substrate may be used as it is as the protective film.

The thickness of the protective film is preferably from 20 µm to 100 µm. The protective film may be laminated on the polarizing film through an adhesion layer (specifically an adhesive layer or a pressure-sensitive adhesive layer), or may be laminated so as to be in close contact with the polarizing film (without through any adhesion layer). The adhesive layer is formed of any appropriate adhesive. The adhesive is, for example, a polyvinyl alcohol-based adhesive.

B. Others

The pressure-sensitive adhesive layer may be formed of any appropriate pressure-sensitive adhesive. An acrylic pressure-sensitive adhesive is typically used. The thickness of the pressure-sensitive adhesive layer is preferably from 7 µm to 25 µm.

The release film typically includes a plastic film and a releasability-imparting layer provided on one side of the plastic film. A polyester film is preferably used as the plastic film. The thickness of the release film is preferably from 25 µm to 50 µm.

The surface protective film may function as a protective film for the polarizing plate. The surface protective film is typically a plastic film or a laminate of plastic films. A material for the plastic film is, for example, polyester or polypropylene. The thickness of the surface protective film is preferably from 25 µm to 75 µm.

The other film (layer) is, for example, a retardation plate or a reflective polarizing film. In the lamination of the constituent layers of the optical film, any appropriate pressure-sensitive adhesive or adhesive is typically used.

When the optical film further includes the reflective polarizing film, the reflective polarizing film may be disposed between the polarizing plate 10 and the surface protective film 50. In addition, the reflective polarizing film preferably has a reflection axis in its width direction.

Figure 5:
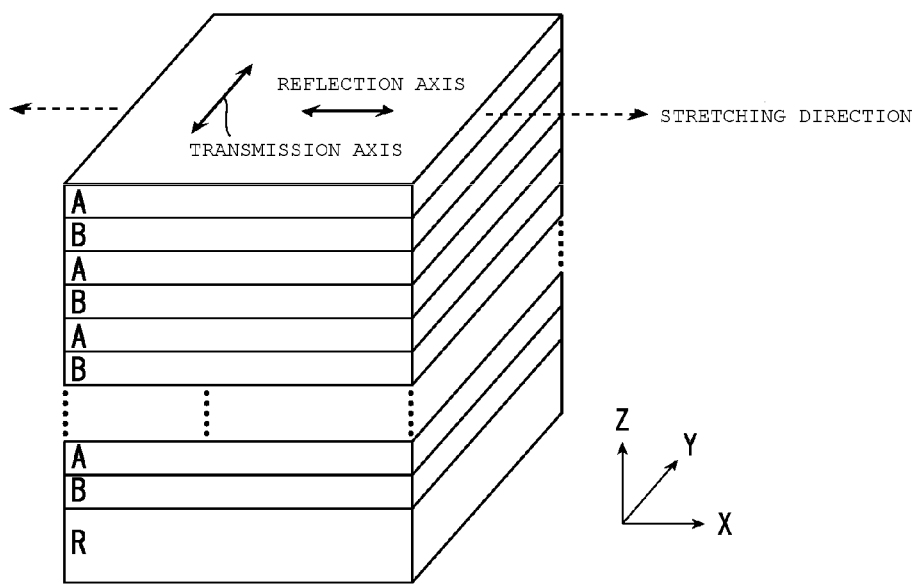
FIG. 5 is a schematic perspective view of an example of a reflective polarizing film.
Figure 6:
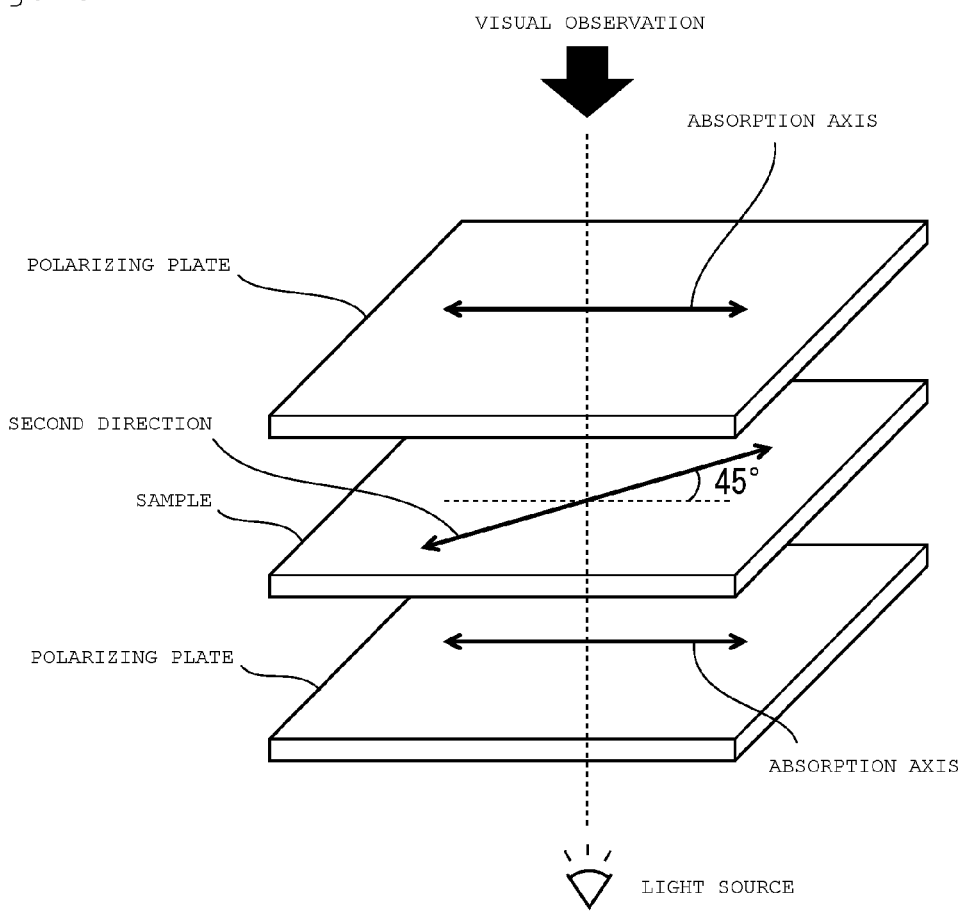
FIG. 6 is a schematic view illustrating an evaluation method for alignment unevenness.

The reflective polarizing film is typically, for example, a linearly polarized light separation-type reflective polarizing film. FIG. 5 is a schematic perspective view of an example of the reflective polarizing film. The reflective polarizing film is a multilayer laminate in which a layer A having birefringence and a layer B substantially free of birefringence are alternately laminated. For example, in the illustrated example, a refractive index nx in the x-axis direction of the layer A is larger than a refractive index ny in the y-axis direction of the layer, and a refractive index nx in the x-axis direction of the layer B and a refractive index ny in the y-axis direction of the layer are substantially equal to each other. Therefore, a difference in refractive index between the layer A and the layer B is large in the x-axis direction and is substantially zero in the y-axis direction. As a result, the x-axis direction serves as a reflection axis and the y-axis direction serves as a transmission axis. The difference in refractive index between the layer A and the layer B in the x-axis direction is preferably from 0.2 to 0.3. It should be noted that the x-axis direction corresponds to the stretching direction of the reflective polarizing film in a production method to be described later.

The layer A is preferably formed of a material that expresses birefringence through stretching. Typical examples of such material include a naphthalene dicarboxylic acid polyester (such as polyethylene naphthalate), polycarbonate, and an acrylic resin (such as polymethyl methacrylate). Of those, polyethylene naphthalate is preferred. The layer B is preferably formed of a material that is substantially free of expressing birefringence even when stretched. A typical example of such material is a copolyester of naphthalene dicarboxylic acid and terephthalic acid.

The reflective polarizing film transmits light having a first polarization direction (such as a p-wave), and reflects light having a second polarization direction perpendicular to the first polarization direction (such as an s-wave) at an interface between the layer A and the layer B. At the interface between the layer A and the layer B, part of the reflected light is transmitted as light having the first polarization direction and the other part thereof is reflected as light having the second polarization direction. Such reflection and transmission are repeated a plurality of times in the reflective polarizing film. Thus, the utilization efficiency of light can be improved.

As illustrated in FIG. 5, the reflective polarizing film preferably includes a reflecting layer R as an outermost layer opposite to the polarizing film 11. When the reflecting layer R is provided, light that has finally returned to the outermost portion of the reflective polarizing film without being utilized can be additionally utilized, and hence the utilization efficiency of light can be additionally improved. The reflecting layer R typically expresses a reflecting function by virtue of the multilayer structure of a polyester resin layer.

The entire thickness of the reflective polarizing film may be appropriately set depending on, for example, purposes and the total number of layers in the reflective polarizing film. The entire thickness of the reflective polarizing film is preferably from 20 μm to 600 μm.

A film described in, for example, JP 9-507308 A may be used as the reflective polarizing film.

A commercial product may be used as it is as the reflective polarizing film, or the commercial product may be subjected to secondary processing (such as stretching) before use. The commercial product is, for example, a product available under the trade name "DBEF" from 3M Company or a product available under the trade name "APF" from 3M Company.

The reflective polarizing film may be typically produced by combining co-extrusion and lateral stretching. The co-extrusion may be performed by any appropriate system. For example, a feed block system may be adopted or a multi-manifold system may be adopted. For example, the material constituting the layer A and the material constituting the layer B are extruded in a feed block, and then the resultant is multilayered with a multiplier. It should be noted that such multilayering apparatus is known to a person skilled in the art. Next, the resultant long multilayer laminate is typically stretched in the direction (TD) perpendicular to the machine direction. The material constituting the layer A (such as polyethylene naphthalate) is increased in refractive index only in the stretching direction by the lateral stretching, and as a result, expresses birefringence. The material constituting the layer B (such as a copolyester of naphthalene dicarboxylic acid and terephthalic acid) is not increased in refractive index in any direction even by the lateral stretching. As a result, a reflective polarizing film having a reflection axis in the stretching direction (TD) and having a transmission axis in the machine direction (MD) can be obtained (the TD corresponds to the x-axis direction of FIG. 2 and the MD corresponds to the y-axis direction of the figure). It should be noted that a stretching operation may be performed with any appropriate apparatus.

The optical film is obtained by laminating the reflective polarizing film and the polarizing film by any appropriate method. As described above, the polarizing film has an absorption axis in the TD, and thus the polarizing film and the reflective polarizing film can be attached to each other by roll-to-roll.

The use of the reflective polarizing film can improve light utilization efficiency to realize high contrast in the liquid crystal display panel to be obtained. As described above, in the present invention, by setting the Nz coefficient of the PVA-based resin film to 1.10 or more (preferably 1.20 or more), a problem such as the generation of a crack (small chip or burr) in the edge side (slit surface) of the polarizing film in the case where a slitting process is continuously performed at a high speed to the width of a liquid crystal cell can be suppressed. Meanwhile, however, as the Nz coefficient of the PVA-based resin film becomes larger, the polarization degree of the polarizing film may reduce. In this context, when the reflective polarizing film is used in combination, while the reduction in the polarization degree of the polarizing film due to the increase in Nz coefficient is compensated by the reflective polarizing film, the generation of a crack at the time of the slitting process can be suppressed by the increase in Nz coefficient.

Further, when the thickness of the polarizing film is thin (for example, less than 10 μm), it is preferred that a long optical raw film in which the polarizing film having an absorption axis in its width direction, and the reflective polarizing film having a reflection axis in its width direction are laminated in advance (preferably integrated by a roll-to-roll method) be subjected to a slitting process to manufacture an optical film roll. When the thickness of the polarizing film is thin, its rigidity is low, and hence the slitting process accuracy in the case of the polarizing film (polarizing plate) alone may not be sufficiently secured. Failure to secure the slitting process accuracy may lead to a reduction in axis accuracy with respect to the reflective polarizing film or a reduction in the accuracy of the slit width. When the polarizing film and the reflective polarizing film are laminated in advance, not only the absorption axis of the polarizing film and the reflection axis of the reflective polarizing film can be allowed to overlap with high accuracy (a structure in which the polarization degree of the polarizing film can be sufficiently compensated with the reflective polarizing film can be realized), but also sufficient rigidity can be imparted to the optical raw film by the reflective polarizing film to suppress fluttering or meandering at the time of the slitting process, thereby improving the slitting process accuracy. As a result, when the optical film and any other optical member (for example, a liquid crystal cell) are continuously laminated in RTP, accuracy (dimensional accuracy of the film) of cutting (including half-cutting) in an optical film width direction to be performed with reference to an edge side (slit surface) and attaching accuracy can be more easily obtained, and the axis direction and attaching position accuracy can be satisfactorily adjusted. As a result, there can be provided a liquid crystal display panel that is more excellent in display characteristics.

C. Manufacturing Method for Optical Film Roll

The width of the long optical film wound into a roll shape as an optical film roll is preferably set depending on the size of the liquid crystal cell to which the optical film is to be attached. Specifically, the long optical film has a width corresponding to a pair of opposite sides of the liquid crystal cell. The long optical film is preferably manufactured by subjecting a long optical raw film having a wide width (rolled raw film before slitting) to a slitting process. It is more preferred that a plurality of long optical films having the same width or different widths be simultaneously manufactured by subjecting a long optical raw film having a wide width (rolled raw film before slitting) to a slitting process.

For the slitting process, a method involving performing the slitting process while unwinding the optical raw film, and a method involving performing the slitting process without unwinding the optical raw film are available, and any of the methods may be adopted. The slitting process is preferably performed while the optical raw film is unwound. When the slitting process is performed while the optical raw film is unwound, the slitting process accuracy becomes more excellent. In addition, in the present invention, in a manufacturing line for the optical raw film, the optical raw film may be slit before being wound.

Therefore, in a preferred embodiment, a manufacturing method for the optical film roll includes the steps of: producing a long optical raw film by laminating a release film, a pressure-sensitive adhesive layer, and a polarizing plate including a polarizing film having an absorption axis in its width direction in the stated order; subjecting the optical raw film to a slitting process in a direction parallel to its lengthwise direction (in a machine direction while conveying the optical raw film in its lengthwise direction) to a width corresponding to a pair of opposite sides of the liquid crystal cell; and winding the long optical film obtained in the slitting step into a roll shape. Further, in another preferred embodiment, a manufacturing method for the optical film roll includes the steps of: producing a long optical raw film by laminating a release film, a pressure-sensitive adhesive layer, a polarizing plate including a polarizing film having an absorption axis in its width direction, and a reflective polarizing film having a reflection axis in its width direction in the stated order; subjecting the optical raw film to a slitting process in a direction parallel to its lengthwise direction (in a machine direction while conveying the optical raw film in its lengthwise direction) to a width corresponding to a pair of opposite sides of the liquid crystal cell; and winding the long optical film obtained in the slitting step into a roll shape. It should be noted that the term "parallel" as used herein includes "substantially parallel". Herein, the term "substantially parallel" includes a case at 0°±5.0°, preferably 0°±3.0°, more preferably 0°±1.0°.

Figure 7A:
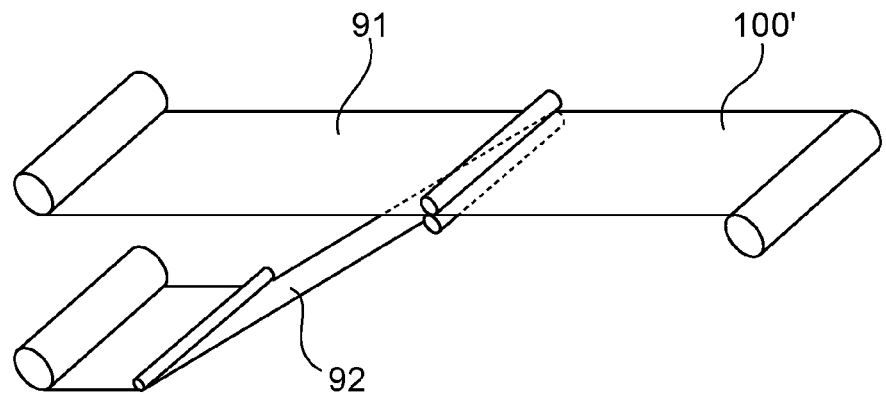
FIG. 7A is a schematic perspective view illustrating an example of a step of producing an optical raw film in the present invention.

FIG. 7A is a schematic perspective view for illustrating an example of the step of producing a long optical raw film. In the illustrated example, a description is made of the case of producing a long optical raw film by laminating a release film, a pressure-sensitive adhesive layer, a polarizing plate including a polarizing film having an absorption axis in its width direction, and a reflective polarizing film having a reflection axis in its width direction in the stated order. In this case, a long optical raw film 100' may be obtained by laminating a polarizing plate 91 with a pressure-sensitive adhesive layer (laminate of the polarizing plate 10, the pressure-sensitive adhesive layer 30, and the release film 50) and a reflective polarizing film 92 with a surface protective film (laminate of the reflective polarizing film 40 and the surface protective film 60) by roll-to-roll. The lamination is performed so that the polarizing plate 10 and the reflective polarizing film 40 may be opposed to each other through the intermediation of any appropriate pressure-sensitive adhesive or adhesive (not shown). It should be noted that in a mode in which the polarizing plate 10 has a protective film on only one side of the polarizing film 11, a surface protective film is disposed on the surface of the polarizing plate with a pressure-sensitive adhesive layer on which the protective film for the polarizing film is not provided, and the lamination is performed while the surface protective film is peeled off (not shown).

Figure 7B:
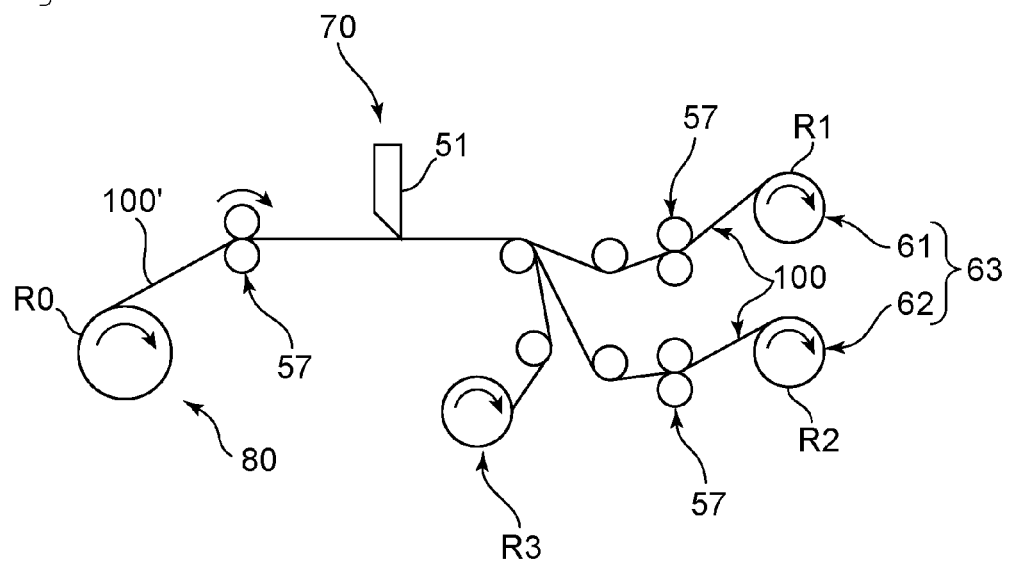
FIG. 7B is a schematic view illustrating an example of an apparatus for manufacturing the optical film roll of the present invention.

FIG. 7B is a schematic view illustrating an example of an apparatus for manufacturing the optical film roll of the present invention. The manufacturing apparatus includes: an unwinding mechanism 80 for a roll R0 of the optical raw film (rolled raw film before slitting) 100'; a cutting mechanism 70 for the optical raw film 100'; and a winding apparatus 63 for wound rolls R1, R2 of the long optical film 100 obtained through a slitting process. When the slitting process is performed in a manufacturing line for a long sheet-shaped product, the unwinding mechanism 80 is not needed.

The unwinding mechanism 80 is configured to unwind the optical raw film 100' from the roll R0 with, for example, a tension generated by nip rollers 57, and includes the nip rollers 57 and a roll-supporting portion for rotating/supporting the roll R0. The roll-supporting portion may be provided with a damping mechanism, a driving mechanism, a tension control mechanism, or the like.

Figure 7C:
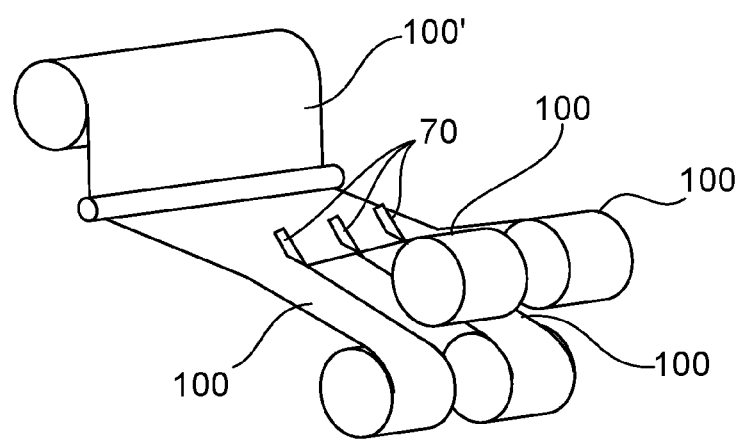
FIG. 7C is a schematic perspective view illustrating an example of a slitting process for an optical raw film in the present invention.

The cutting mechanism 70 includes a cutting blade 51 provided in a conveyance path for the optical raw film 100'. Examples of the cutting blade include a gang blade and a gable blade. A cutting mode is exemplified by a gang mode and a shear cutting mode. For example, rotatable circular cutting blades are disposed at predetermined intervals in the direction of the slitting, and while being passed between the cutting blades and support rolls, the optical raw film 100' may be continuously slit. FIG. 7C is a schematic perspective view illustrating details of the slitting process. In FIG. 7C, a cutting apparatus 70 including a gang blade is illustrated. As illustrated in FIG. 7C, a plurality of the optical films (optical film rolls) 100 may be obtained from the optical raw film 100'. The number of optical films to be obtained from the optical raw film may be appropriately set depending on purposes. In the case of obtaining a plurality of optical films, the optical films may have the same or different widths as long as the width of each optical film corresponds to the size of a liquid crystal cell to which the optical film is to be attached.

D. Use Method

The optical film roll of the present invention is cut to a length corresponding to the other pair of opposite sides of the liquid crystal cell to be continuously attached to the surface of the liquid crystal cell. The term "length (width) corresponding to a pair (the other pair) of opposite sides of the liquid crystal cell" as used herein refers to a length (width) that allows an appropriate margin during manufacture (specifically, an exposed portion to which the optical film is not attached) to be secured at the edge portion of the liquid crystal cell when the optical film is positioned and attached to the liquid crystal cell. Specifically, the term "length (width) corresponding to a pair (the other pair) of opposite sides of the liquid crystal cell" refers to a length (width) excluding exposed portions at both end portions of the liquid crystal cell in the direction of the pair (the other pair) of opposite sides.

The cutting may also encompass a mode in which at least the polarizing film (polarizing plate) is cut to form a cutting line (so-called half-cutting). In the optical film 100 in the illustrated example, for example, portions except for the release film 40, i.e., the surface protective film 50, the polarizing plate 10, and the pressure-sensitive adhesive layer 30 are cut. It should be noted that in the optical film roll of the present invention, the long optical film may be in a state in which a plurality of the cutting lines are formed at an interval equal to the length corresponding to the other pair of opposite sides of the liquid crystal cell.

The cutting direction of the optical film is typically the direction of the absorption axis of the polarizing film (width direction of the optical film), or a direction perpendicular to the absorption axis of the polarizing film (the lengthwise direction of the optical film). The cutting in the direction perpendicular to the absorption axis of the polarizing film is typically performed by: continuously cutting the optical film to a predetermined width while conveying the optical film in the longitudinal direction; and winding the optical film into a roll shape after the cutting. Herein, the cutting in the direction perpendicular to the absorption axis of the polarizing film is sometimes referred to as "slitting process".

In a preferred embodiment, the optical film of the present invention (hereinafter referred to as "first optical film") is attached to one side of a liquid crystal cell, and a second optical film different from the first optical film is attached to the other side of the liquid crystal cell to manufacture a liquid crystal display panel. The second optical film has a long shape like the first optical film, and has a width corresponding to the pair of opposite sides of the liquid crystal cell. The second optical film is cut to a length corresponding to the other pair of opposite sides of the liquid crystal cell to be continuously attached to the surface of the liquid crystal cell. The second optical film includes a polarizing film having an absorption axis in its lengthwise direction. The direction of the absorption axis of the polarizing film may encompass directions at from −5° to +5° counterclockwise with respect to the lengthwise direction of the second optical film. The polarizing films on the upper and lower sides of the liquid crystal display panel to be obtained according to this embodiment have absorption axes perpendicular to each other.

An optical film roll set of the present invention includes the optical film roll of the present invention (first optical film roll) and a second optical film roll obtained by winding the second optical film into a roll shape.

Any appropriate mode may be adopted as the driving mode of the liquid crystal cell. The driving mode is preferably a VA mode or an IPS mode.

EXAMPLES

Hereinafter, the present invention is specifically described by way of Examples, but the present invention is not limited to Examples below. It should be noted that measurement method of thickness of polarizing film obtained is as described below.

(Thickness of Polarizing Film)

A dial gauge (manufactured by PEACOCK, product name: "DG-205 type pds-2") was used to measure the thickness of a PVA-based resin layer or a PVA-based resin film after dyeing treatment to be described later.

Example 1

Production of Laminate (Thermoplastic Resin Substrate)

A cycloolefin-based resin film (manufactured by JSR Corporation, trade name "ARTON") having a long shape, a thickness of 200 μm, and a Tg of 123° C. was used as a thermoplastic resin substrate.

(Preparation of Application Liquid)

A polyvinyl alcohol (PVA) resin having a polymerization degree of 1,800 and a saponification degree of from 98 to 99% (manufactured by The Nippon Synthetic Chemical Industry Co., Ltd., trade name "Gohsenol (trademark) NH-18") was dissolved in water to prepare an aqueous solution of polyvinyl alcohol having a concentration of 7 wt %.

(Formation of PVA-Based Resin Layer)

The application liquid was applied to one surface of the thermoplastic resin substrate, which had been subjected to stretching treatment, with a die coater (die coating method), and was then dried at 100° C. for 180 seconds to form a PVA-based resin layer having a thickness of 9 μm. Thus, a laminate was produced.

<Shrinking/Stretching Treatment>

As illustrated in FIG. 3, the resultant laminate was subjected to dry stretching with a simultaneous biaxial stretching machine at 140° C. in the TD by 5.0 times while being shrunk in the MD by 40%.

<Dyeing Treatment>

Next, the laminate was immersed in an aqueous solution of iodine at 25° C. (iodine concentration: 0.5 wt %, potassium iodide concentration: 10 wt %) for 30 seconds.

<Cross-Linking Treatment>

The laminate after the dyeing was immersed in an aqueous solution of boric acid at 60° C. (boric acid concentration: 5 wt %, potassium iodide concentration: 5 wt %) for 60 seconds.

<Washing Treatment>

After the cross-linking treatment, the laminate was immersed in an aqueous solution of potassium iodide at 25° C. (potassium iodide concentration: 5 wt %) for 5 seconds.

Thus, a polarizing film having a thickness of 3 μm was produced on the thermoplastic resin substrate.

A protective film (thickness: 40 μm, manufactured by Fujifilm Corporation, trade name "TD40UL") was attached to the polarizing film side of the laminate through a polyvinyl alcohol-based adhesive. Next, the thermoplastic resin substrate was peeled from the polarizing film to provide a polarizing plate.

Next, to the polarizing film side of the polarizing plate, a surface protective film with a pressure-sensitive adhesive layer having a thickness of 60 μm (manufactured by Mitsubishi Polyester Film, Inc., trade name: "PPF-100T") was attached. After that, on the protective film side of the polarizing plate, an acrylic pressure-sensitive adhesive layer having a thickness of 23 μm was formed, and to its surface, a release film having a thickness of 38 μm (manufactured by Mitsubishi Polyester Film, Inc., trade name: "MRF-ELB4") was attached. Thus, a long optical raw film was obtained. The resultant optical raw film was wound into an optical raw film roll.

Example 2

A polarizing plate was produced in the same manner as in Example 1 except that: a PVA-based resin layer having a thickness of 10 μm was formed in the production of the laminate; the shrinkage ratio in the MD was changed to 35% in the shrinking and stretching treatment; and the iodine concentration was changed to 0.45 wt % in the dyeing treatment. It should be noted that the resultant polarizing film had a thickness of 3 μm. Further, an optical raw film roll was obtained in the same manner as in Example 1.

Example 3

A polarizing plate was produced in the same manner as in Example 1 except that: a PVA-based resin layer having a thickness of 13 μm was formed in the production of the laminate; the shrinkage ratio in the MD was changed to 15% in the shrinking and stretching treatment; and the iodine concentration was changed to 0.35 wt % in the dyeing treatment. It should be noted that the resultant polarizing film had a thickness of 3 μm. Further, an optical raw film roll was obtained in the same manner as in Example 1.

Example 4

A polarizing plate was produced in the same manner as in Example 1 except that: a PVA-based resin film having a thickness of 75 μm (manufactured by KURARAY CO., LTD., trade name: "PS-7500") was used in place of the laminate; the temperature was changed to 110° C. and the shrinkage ratio in the MD was changed to 20% in the shrinking and stretching treatment; and the iodine concentration was changed to 0.2 wt % in the dyeing treatment. It should be noted that the resultant polarizing film had a thickness of 19 μm. Further, an optical raw film roll was obtained in the same manner as in Example 1.

Comparative Example 1

A polarizing plate was produced in the same manner as in Example 1 except that: a PVA-based resin layer having a thickness of 7 μm was formed in the production of the laminate; the shrinkage ratio in the MD was changed to 55% in the shrinking and stretching treatment; and the iodine concentration was changed to 0.53 wt % in the dyeing treatment. It should be noted that the resultant polarizing film had a thickness of 3 μm. Further, an optical raw film roll was obtained in the same manner as in Example 1.

The polarizing plate or optical raw film roll obtained in each of Examples and Comparative Example was evaluated. Evaluation methods and evaluation criteria are as described below. Table 1 shows measurement results.

1. Nz Coefficient of PVA-Based Resin Film

The retardation of the polarizing film was measured with light having wavelengths ($\lambda$) of 848.2 nm, 903.4 nm, 954.7 nm, 1,000.9 nm, 1,045.9 nm, and 1,089.0 nm at 23° C. using a retardation measuring apparatus (manufactured by Oji Scientific Instruments, trade name: "KOBRA 31X100/IR"). Specifically, a front retardation (Re) and a retardation (R30), which was measured by tilting the film by 30° with its absorption axis as a tilt axis, were measured at each wavelength, and its Nz coefficient was determined from the resultant retardation values using three-dimensional refractive index calculation software (N-Calc. Ver. 1.23). It should be noted that the number of times of the measurement carried out was such that a coefficient of determination regarding the above-mentioned approximate curve was 0.9 or more.

2. Slitting Resistance

The obtained polarizing plate was wound into a roll having a length of 50 m (optical raw film roll). The roll was, while being conveyed at 30 m/min, subjected to a slitting process at positions 100 mm away from both end portions in its width direction to produce an optical film roll. A crack generation status and the presence or absence of rupture at both end portions of the resultant optical film roll were investigated and used as an indicator for slitting resistance. It should be noted that the slitting process was performed in a shear cutting mode using a gable blade as a cutting blade.
(Evaluation Criteria)
⊚: 0 to 5 cracks
○: 5 to 10 cracks
Δ: 10 to 15 cracks
×: 15 or more cracks or rupture 3. Polarization Degree The single axis transmittance (Ts), parallel transmittance (Tp), and crossed transmittance (Tc) of the polarizing film (polarizing plate) were measured using a spectrophotometer (manufactured by MURAKAMI COLOR RESEARCH LABORATORY, product name "Dot-41"), and its polarization degree (P) at a single axis transmittance of 40% was determined by the following equation. It should be noted that those transmittances are Y-values obtained by subjecting values measured with the two-degree field of view (C light source) of JIS Z 8701 to color correction.

Polarization degree$(P)=\{(Tp-Tc)/(Tp+Tc)\}^{1/2} \times 100$ (Evaluation Criteria)
⊚: 99.95% or more
○: 99.93% or more
×: Less than 99.9%

TABLE 1

| | Thickness of PVA-based resin film | Stretching Mode | Ratio | Shrinkage ratio | Nz coefficient | Thickness of polarizing film | Slitting resistance | Polarization degree |
|---|---|---|---|---|---|---|---|---|
| Example 1 | 9 μm | Dry | 5.0 times | 40% | 1.10 | 3 μm | ○ | ⊚ |
| Example 2 | 10 μm | Dry | 5.0 times | 35% | 1.20 | 3 μm | ⊚ | ⊚ |
| Example 3 | 13 μm | Dry | 5.0 times | 15% | 1.40 | 3 μm | ⊚ | ○ |

TABLE 1-continued

| | Thickness of PVA-based resin film | Stretching Mode | Stretching Ratio | Shrinkage ratio | Nz coefficient | Thickness of polarizing film | Slitting resistance | Polarization degree |
|---|---|---|---|---|---|---|---|---|
| Example 4 | 75 μm | Dry | 5.0 times | 20% | 1.35 | 19 μm | ◎ | ○ |
| Comparative Example 1 | 7 μm | Dry | 5.0 times | 55% | 1.05 | 3 μm | X | ◎ |

[Evaluation]

As apparent from Table 1, when the polarizing film has a small thickness (for example, less than 10 μm), excellent slitting resistance can be secured by optimizing the Nz coefficient to a given value or more.

INDUSTRIAL APPLICABILITY

The optical film of the present invention is suitably used for a liquid crystal display panel of, for example, a liquid crystal television, a liquid crystal display, a mobile phone, a personal digital assistant, a digital camera, a video camera, a portable game console, a car navigation system, a copying machine, a printer, a fax machine, a timepiece, or a microwave oven.

REFERENCE SIGNS LIST 10 polarizing plate
11 polarizing film
21 first protective film
22 second protective film
30 pressure-sensitive adhesive layer
40 release film
50 surface protective film
100 optical film roll (optical film)

The invention claimed is:

1. An optical film roll, which has a width corresponding to a pair of opposite sides of a liquid crystal cell and is capable of being cut to a length corresponding to another pair of opposite sides of the liquid crystal cell to be continuously attached to a surface of the liquid crystal cell,
the optical film roll comprising a long optical film wound into a roll shape, the long optical film obtained by subjecting a long optical raw film, which includes a polarizing film having an absorption axis in its width direction, to a slitting process in a machine direction while conveying the long optical raw film in its lengthwise direction,
the polarizing film comprising a polyvinyl alcohol-based resin film that contains a dichromatic substance,
wherein the polyvinyl-alcohol-based resin film that contains a dichromatic substance has a polarization degree of 99.93% or more at a single axis transmittance of 40%, and an Nz coefficient of 1.10 or more and 1.50 or less, and
wherein the polarizing film is obtained by shrinking and stretching the polyvinyl alcohol-based resin film formed on a thermoplastic resin substrate in an MD (machine direction) and a TD (direction perpendicular to the machine direction), respectively.

2. An optical film roll according to claim 1, wherein the polarizing film has a thickness of less than 10 μm.

3. An optical film roll set, comprising:
a first optical film roll comprising the optical film roll according to claim 2; and
a second optical film roll that has a width corresponding to the pair of opposite sides of the liquid crystal cell, is capable of being cut to a length corresponding to the another pair of opposite sides of the liquid crystal cell to be continuously attached to a surface of the liquid crystal cell, and includes a long optical film wound into a roll shape, the long optical film including a polarizing film having an absorption axis in its lengthwise direction.

4. An optical film roll according to claim 1, wherein the optical raw film includes a release film, a pressure-sensitive adhesive layer, and the polarizing film, which are laminated in the stated order.

5. An optical film roll set, comprising:
a first optical film roll comprising the optical film roll according to claim 4; and
a second optical film roll that has a width corresponding to the pair of opposite sides of the liquid crystal cell, is capable of being cut to a length corresponding to the another pair of opposite sides of the liquid crystal cell to be continuously attached to a surface of the liquid crystal cell, and includes a long optical film wound into a roll shape, the long optical film including a polarizing film having an absorption axis in its lengthwise direction.

6. An optical film roll according to claim 1, wherein the optical raw film includes a release film, a pressure-sensitive adhesive layer, the polarizing film, and a reflective polarizing film, which are laminated in the stated order.

7. An optical film roll set, comprising:
a first optical film roll comprising the optical film roll according to claim 6; and
a second optical film roll that has a width corresponding to the pair of opposite sides of the liquid crystal cell, is capable of being cut to a length corresponding to the another pair of opposite sides of the liquid crystal cell to be continuously attached to a surface of the liquid crystal cell, and includes a long optical film wound into a roll shape, the long optical film including a polarizing film having an absorption axis in its lengthwise direction.

8. An optical film roll set, comprising:
a first optical film roll comprising the optical film roll according to claim 1; and
a second optical film roll that has a width corresponding to the pair of opposite sides of the liquid crystal cell, is capable of being cut to a length corresponding to the another pair of opposite sides of the liquid crystal cell to be continuously attached to a surface of the liquid crystal cell, and includes a long optical film wound into a roll shape, the long optical film including a polarizing film having an absorption axis in its lengthwise direction.

9. An optical film roll set according to claim 8, wherein a driving mode of the liquid crystal cell is a VA mode or an IPS mode.

10. A manufacturing method for an optical film roll having a width corresponding to a pair of opposite sides of a liquid crystal cell, and is capable of being cut to a length corresponding to another pair of opposite sides of the liquid crystal cell to be continuously attached to a surface of the liquid crystal cell, the manufacturing method comprising the steps of:

subjecting a long optical raw film, which includes a polarizing film having an absorption axis in its width direction, to a slitting process in a direction parallel to a lengthwise direction of the long optical raw film to a width corresponding to the pair of opposite sides of the liquid crystal cell, the polarizing film comprising a polyvinyl alcohol-based resin film that contains a dichromatic substance, wherein the polyvinyl-alcohol-based resin film that contains a dichromatic substance has a polarization degree of 99.93% or more at a single axis transmittance of 40%, and an Nz coefficient of 1.10 or more and 1.50 or less, and wherein the polarizing film is obtained by shrinking and stretching the polyvinyl alcohol-based resin film formed on a thermoplastic resin substrate in an MD (machine direction) and a TD (direction perpendicular to the machine direction), respectively; and winding a long optical film obtained in the slitting step into a roll shape.

11. A manufacturing method for an optical film roll according to claim 10, wherein the polarizing film has a thickness of less than 10 μm.

* * * * *